Patented June 3, 1952

2,599,468

UNITED STATES PATENT OFFICE 2,599,468

NONADECYL GLYCOLS

Charles H. McKeever, Glenside, Pa., assignor to Rohm & Haas Company, Philadelphia, Pa., a corporation of Delaware No Drawing. Application November 17, 1949, Serial No. 127,999

1 Claim. (Cl. 260—635)

This invention relates to nonadecyl glycols and to a method for their preparation.

It is known that methyl oleate reacts with carbon monoxide and hydrogen in the presence of a cobalt catalyst to yield methyl formylstearates. It is now found that these can be reduced and yield a product which consists essentially of a mixture of 9-hydroxymethyl- and 10-hydroxymethyl-1-octadecanol. A relatively small amount of isomers in which the hydroxymethyl group is in other positions between the 4 and 14 positions may be present. The reduction is accomplished by hydrogenating the formylstearates in the presence of copper chromite.

The new product is a diprimary alcohol which is a soft solid melting over a range from 40° C. to 70° C., owing to the presence of isomers. It is of particular interest because of its ready solubility in oils and organic solvents and because of its stability. It reacts with acids to form esters. With dicarboxylic acids it forms oil-soluble polyesters in quantitative yields. These are valuable as additives to increase the viscosity of organic fluids and to improve the temperature-viscosity behavior of lubricating fluids based on petroleum products or upon synthetic solvents such as oily esters or ethers. In such applications the stability resulting from the initial presence of primary alcohol group is of great importance.

The primary starting material for preparing the long-chained glycols of this invention are the lower alkyl oleates. Since the ester group which includes the alkyl substituent disappears during hydrogenation, the use of larger alkyl groups than butyl is inadvisable. The use of methyl oleate and ethyl oleate is preferred even though propyl and butyl oleates give the same reaction. The alkyl oleate is treated with 0.001% to 0.5% of an organic solvent-soluble cobalt salt, such as cobalt oleate, or 0.2% to 3% of active, reduced metallic cobalt. A mixture of carbon monoxide and hydrogen is passed into the alkyl oleate at temperatures of 140° C. to 250° C. and pressures from 60 to 1000 or more atmospheres. The gas mixture is composed of carbon monoxide and hydrogen in mole ratios from 1 to 2 to 2 to 1. Preferred temperatures are 150° C. to 180° C. and preferred pressures are 150 to 275 atmospheres. The gas mixture is run into the alkyl oleate in excess and continuously vented. In about one-half to two hours reaction is complete as is indicated by lack of absorption of gas.

The product of this reaction is now freed of its cobalt content. A convenient method for accomplishing this is to bubble hydrogen through the reaction mixture at 0-20 atmospheres pressure and 80°-150° C. until the brown color due to the presence of cobalt carbonyl disappears. The cobalt carbonyl is converted to finely divided cobalt metal which is removed by filtration at 40°-70° C. The metal is so finely divided that it is advantageous to use a filter aid such as diatomaceous earth. The cobalt may also be removed by centrifuging.

The product is then mixed with 2% to 10% of its weight of a copper chromite catalyst. Hydrogen is then passed into the reaction mixture which is heated at 250° C. to 350° C., preferably 265°-280° C., under a pressure between 100 and 1000 atmospheres. The preferred pressures are between 2500 and 5000 lbs. per square inch. After two to six hours and when hydrogen is no longer absorbed, the reaction is discontinued. The reaction mixture is filtered hot. The product is then obtained by distilling under reduced pressure. The distillate is usually collected as a liquid which sets to a soft solid.

Typical preparations of the product of this invention follow.

Example 1

(a) A charge of 300 parts by weight of methyl oleate and 5 parts of finely divided, freshly reduced cobalt was placed in a pressure apparatus. A mixture of carbon monoxide and hydrogen in a 1:1 mole ratio was passed through the mixture under 250 atmospheres pressure and vented continuously. The apparatus was heated to 150° C. There was a short induction period before gas absorption started. After 1.5 hours the absorption of gas was found to be slow and the reaction was discontinued. The reaction mixture was cooled to 80° C., vented, and discharged. It was then stirred vigorously at 120° C. and a rapid stream of hydrogen passed through. The color gradually changed from brown to light yellow. The finely divided cobalt was removed by filtration. The product was stripped to 170° C./0.6 mm. This removed any unchanged methyl oleate and the methyl stearates and palmitates originally present in the starting material. The residue consists essentially of a mixture of methyl 9-formyl- and 10-formyl stearates.

(b) There were mixed 5 parts of copper chromite and 100 parts of the above product, and the mixture was placed in a high pressure vessel and heated to 275° C. under hydrogen at 4000 lbs. pressure. After five hours the pressure was released and the reaction mixture cooled below 100° C. It was then filtered and distilled under reduced pressure. Up to 185° C./0.6 mm. a fraction of 20 parts by weight was taken off. A fraction of 75 grams was then obtained between 185° C. and 196° C./0.6 mm. It was analyzed and found to be nonadecyl in a purity of 96%.

*Example 2*

(a) A charge of 330 grams of methyl oleate (about 375 ml.) was mixed with 7.5 ml. of a solution of cobalt 2-ethylhexoate in benzene containing 6% of cobalt as metal and placed in a tubular pressure vessel. A mixture of carbon monoxide and hydrogen in a 1:1 mole ratio was passed through the charge at 3500 lbs. pressure. The temperature was 160° C. Gas was vented from the apparatus. When it was evident that gas was not being absorbed, the reaction mixture was cooled to 100° C. and vented. A rapid stream of hydrogen was then passed through the mixture at 120° C. and 15 lbs. pressure until the brown color of cobalt carbonyl had disappeared. The mixture was cooled to 60° C. and discharged. The cobalt was removed by filtration. The crude product was stripped to 160° C./0.5 mm. to remove any unchanged raw material.

(b) A 100-gram portion of the material was then mixed with 6 grams of copper chromite and placed in a shaker bomb where it was heated to 280° C. under hydrogen at a pressure of 5000 lbs. After four hours this reaction was discontinued. The reaction mixture was filtered hot and fractionally distilled under reduced pressure. Up to 170° C./0.5 mm. there was taken a forerun of 9 grams. The main fraction was taken at 170°–212° C./0.5 mm. It amounted to 85 grams and was 95% pure nonadecyl glycol. The broad melting range of this product indicates that it is a mixture. It consists chiefly of 9-hydroxymethyl-1-octadecanol and 10-hydroxymethyl-1-octadecanol.

*Example 3*

Repetition of the above procedural steps starting with 315 grams of ethyl oleate and 7 ml. of the benzene solution of cobalt 2-ethylhexoate as a typical organic solvent-soluble cobalt salt yielded 81 grams of product, distilling at 180° C. to 215° C./0.6 mm. The product appeared the same as that obtained in Example 2b. By hydroxyl number it had a purity of 94% and was a mixture of 9-hydroxymethyl- and 10-hydroxmethyl-1-octadecanol.

Butyl oleate as the starting oleate likewise yields nonadecyl glycol.

*Example 4*

(a) There were mixed 375 ml. of methyl oleate and 20 ml. of a solution of cobalt carbonyl in benzene which contained 3.0% of cobalt as metal. This mixture was placed in a pressure vessel and a 60:40 mixture of carbon monoxide and hydrogen passed therethrough under a pressure of 3000 lbs. The vessel was vented as the reaction proceeded. When absorption became slow, the reaction was discontinued and reaction mixture was treated as in Example 2a for cobalt removal.

(b) The above product which had not been stripped was hydrogenated as in the above examples with copper chromite as catalyst under a pressure of 2500 lbs. and at a temperature of 260° C. After catalyst had been removed by filtering, the hydrogenated material was distilled at low pressure. A forerun of 30 grams was taken up to 175° C./0.5 mm. The main fraction was taken between 175° and 208° C./0.5 mm. By analysis it proved to be nonadecyl glycol of a purity of 92%. It was a mixture consisting chiefly of 9-hydroxymethyl-1-octadecanol and 10-hydroxymethyl-1-octadecanol.

I claim:

A product consisting essentially of a mixture of 9-hydroxymethyl-1-octadecanol and 10-hydroxymethyl-1-octadecanol.

CHARLES H. McKEEVER.

REFERENCES CITED

The following references are of record in the file of this patent:

UNITED STATES PATENTS

| Number | Name | Date |
|---|---|---|
| 2,079,414 | Lazier | May 4, 1937 |
| 2,094,611 | Lazier | Oct. 5, 1937 |
| 2,121,580 | Berliner et al. | June 21, 1938 |
| 2,437,600 | Gresham et al. | Mar. 9, 1948 |
| 2,462,448 | Whitman | Feb. 22, 1949 |
| 2,491,915 | Barrick et al. | Dec. 20, 1949 |

OTHER REFERENCES

Bureau of Mines, Report of Investigations (R. I.) No. 4270, June 1948, by Wender and Orchin, page 22.